Feb. 14, 1956 L. L. HOLZENTHAL 2,734,635
CENTRIFUGAL EXTRACTOR
Filed Feb. 26, 1953 2 Sheets-Sheet 1
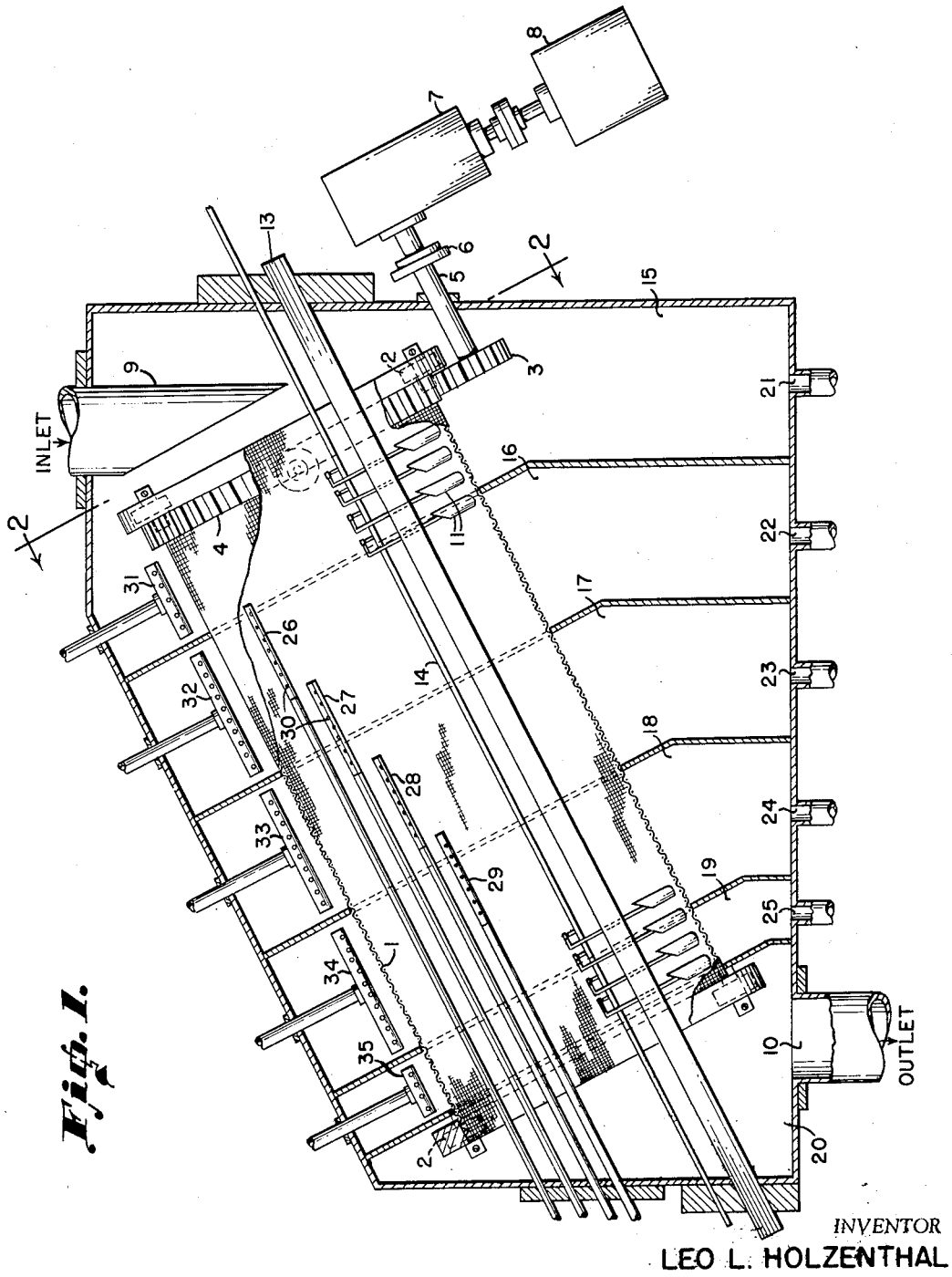
INVENTOR
LEO L. HOLZENTHAL
BY
*J. A. Seegust*
ATTORNEY

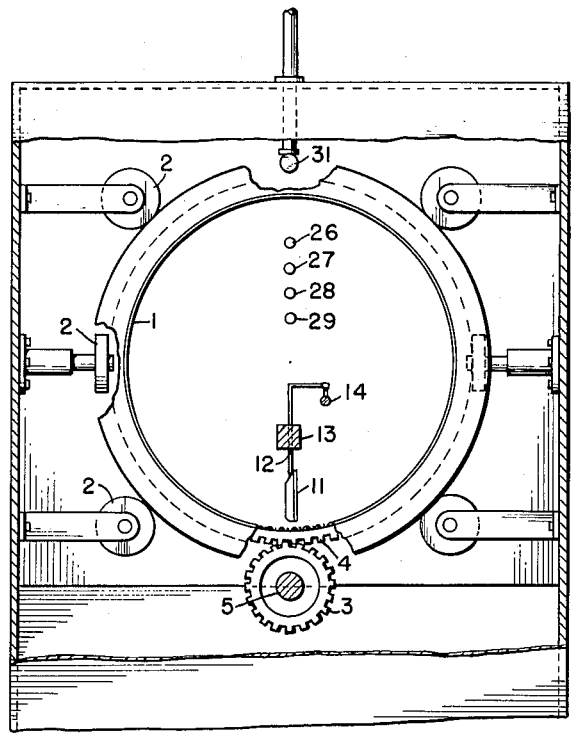
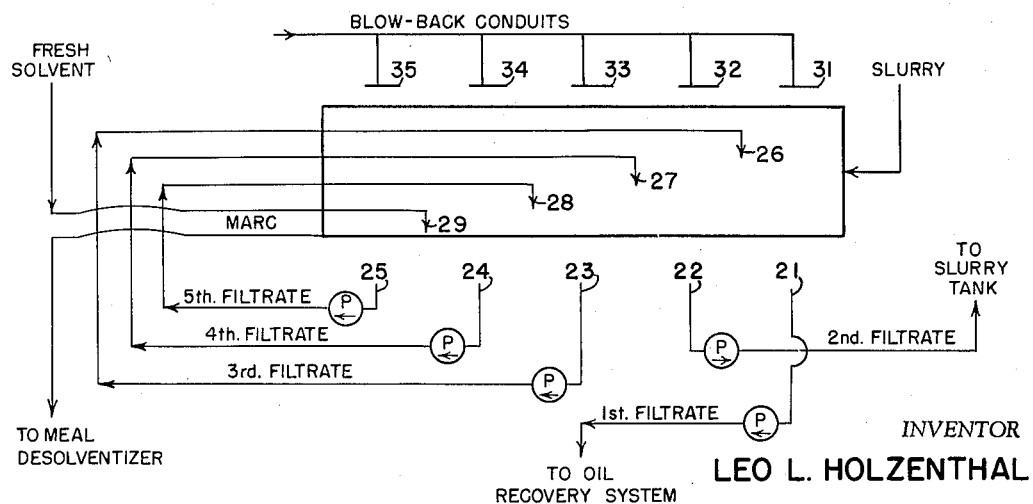

United States Patent Office 2,734,635
Patented Feb. 14, 1956

2,734,635

CENTRIFUGAL EXTRACTOR

Leo Leonhard Holzenthal, New Orleans, La., assignor to the United States of America as represented by the Secretary of Agriculture Application February 26, 1953, Serial No. 339,191

2 Claims. (Cl. 210—67)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

The invention relates to an apparatus for mixing granular solid materials with liquid materials and separating the undissolved solid from the resultant liquid. More particularly, the invention provides an apparatus particularly adapted for use in contacting oil bearing vegetable materials with oil solvents in the solvent extraction of oil from such oil bearing materials.

In general, the apparatus comprises: a porous tube rotatably supported along its periphery; a means of rotating the tube at a rate subjecting material within the tube to centrifugal force; a material inlet at one end of the tube and a material outlet at the other end of the tube; vanes within the tube arranged to contact material moving in conjunction with the walls of the tube and to impart motion toward the outlet end of the tube to the material; a series of separate compartments, each provided with a liquid outlet, surrounding the outer portions of sections of the tube; a series of conduits within the tube arranged to deposit liquids inside the tube; and a series of conduits outside the tube which are arranged to subject portions of the outer surfaces of the tube to the action of a flowing stream.

It has been recently discovered (co-pending application Serial Number 276,026, filed March 11, 1952) that when an oil bearing vegetable material is subjected to a mild heat treatment in which the material, adjusted to a relatively high moisture content, is heated to increasingly higher temperatures while its moisture content is lowered, and this treatment is followed by a crisping treatment in which the hot, relatively moist material is cooled while its moisture content is further lowered, the oil contained in the material is readily extractable, the material has the form of relatively noncompressible particles, and is relatively free of "fines."

The apparatus provided by the present invention is particularly adapted for use in the treatment of oil bearing vegetable materials prepared for solvent extraction in the above manner. While the apparatus is not limited to such a use and can suitably be used in solvent extraction processes generally and in any process in which relatively small solid particles are mixed with liquids and the undissolved solids are separated from the liquids, for clarity of illustration, the apparatus will be described with particular reference to an embodiment particularly adapted for use in the solvent extraction of cottonseed by the process of the above co-pending application.

Figure 1 illustrates the apparatus viewed from one side.

Figure 2 illustrates the apparatus viewed from one end.

Figure 3 is a schematic illustration of a suitable flow of materials through the apparatus.

In the embodiment of the apparatus shown in Figures 1 and 2, porous tube 1 is rotatably supported along its periphery by rollers 2 which are rotatably mounted on a suitable frame. Tube 1 is preferably mounted at an angle of about 30° on a frame adapted to support the tube at various angles.

Porous tube 1 can be composed of any porous material adapted to maintain a tubular shape, e. g., reinforced metal screen, reinforced plastic screen, and the like. The pores of the tube can vary widely in size. The tube is preferably constructed of a reinforced screen, the inner surface of which is covered with a screen type filter medium having the desired filtration characteristics of rate of liquid passage and amount of solid particles retained.

Tube 1 is rotated by the action of gear 3 upon gear 4 which is attached to the outer surface of the tube. Gear 3 is attached to axle 5 which is coupled to reducer 7 which is coupled to motor 8. Tube 1 can be rotated by substantially any conventional means, such as gears, sprockets, belts and the like, connected to a suitable source of power. The tube is rotated at least fast enough to move all of the material within the tube through a substantially circular path in conjunction with the motion of the surface of the tube. The rate of rotation is preferably adjusted to the minimum rate which will provide a sufficient rate of liquid passage, through the solid material and the pores of the tube, for the particular particles, liquids, solid materials and pore sizes involved.

Material to be treated is placed within the tube by means of inlet 9 and the solid material remaining after treatment within the tube is discharged by means of outlet 10.

Vanes 11 are arranged along the axis of the tube to contact material within the latter and to cause the material to move toward the outlet end of the tube. Vanes 11 are substantially rectangular, flat plates attached to vane axles 12 which are rotatably supported by bar 13 which is adjustably mounted on stationary support members. The angle of vanes 11 with respect to the surface of tube 1 is controlled by the position of adjustment rod 14 connected to axles 12 of the vanes. The rate at which material within tube 1 traverses the tube is controlled by the adjustment of the angle of vanes 11. The amount of material allowed to remain pressed against the inner surface of tube 1 by the action of centrifugal force is controlled by the adjustment of support bar 13 to position vanes 11 closer to or further from the surface of tube 1.

A series of compartments 15 to 20, of which compartments 15 to 19 are each fitted with liquid outlets 21 to 25, surround sections of tube 1. The walls of the compartments extend to within close proximity to the outer surface of tube 1 and compartment walls are pierced where necessary by inlet 9, outlet 10, support bar 13, control rod 14, and the like. Where, as in the embodiment illustrated, the apparatus is to be used for contacting solid particles with a relatively volatile liquid, the compartments are preferably joined together and the members piercing the compartment are preferably surrounded by gas-tight junctions so that the compartments constitute a substantially gas-tight enclosure surrounding the whole of the apparatus.

Within tube 1 a series of liquid conduits, 26 to 29, are arranged to deposit liquids within the tube. Conduits 26 to 29 are preferably closed pipes pierced with holes 30 arranged to spray liquid over an area of the interior of tube 1. The liquids so deposited become mixed with the solid particles in the tube and then are thrown out into compartments 15 to 20 by centrifugal force. Outside of the tube a series of blow-back conduits, 31 to 35, are arranged to subject portions of the outer surfaces of the tube to the action of a flowing stream. Conduits 31 to 35 are preferably pipes arranged to subject the outer portion of each section of the tube surrounded by compartments 15 to 19 to the action of a flowing stream of a liquid or gas.

In using the apparatus in the solvent extraction of an oil from an oil bearing vegetable material, the oil bearing material is preferably prepared for solvent extraction by the process of the above co-pending application. The oil bearing material is preferably slurried with the desired amount of an oil solvent and the slurry is introduced into the tube by means of inlet 9. Centrifugal force exerted by the rotation of tube 1 tends to throw substantially all of the liquid initially in contact with the oil bearing material into compartment 15.

Compartment outlets 21 to 25 are preferably connected in accordance with the flow diagram illustrated in Figure 3. Thus, as shown in this figure, the incoming slurry is subjected to a first centrifuging over the compartment 15. The liquid extracted at this point will have the highest concentration of dissolved oil. This first filtrate is therefore withdrawn through outlet 21 and sent to the oil-recovery system. When the solid material has filled the length of tube 1 and centrifugal extraction is taking place continuously, fresh solvent is introduced through pipe 29 and sprayed over that portion of the oil-bearing solids closest to the outlet end of the apparatus. The filtrate centrifuged into chamber 19 (5th filtrate) is withdrawn through outlet 25 and pumped back into the apparatus through pipe 28, from which it is sprayed onto a portion of oil-bearing solids somewhat more concentrated in oil content. A solution (4th filtrate) richer in oil than the 5th filtrate is recovered from chamber 18 by means of outlet 24. This solution is also pumped back to the apparatus through pipe 27 from which it is sprayed onto a portion of solids in advance of that sprayed by pipes 28 and 29. Liquid contained in this latter portion is centrifuged into chamber 17 and removed therefrom through outlet 23. The liquid consisting of dissolved oil (3rd filtrate) is pumped back into the centrifuge tube through pipe 26 and sprayed onto the portion of solids immediately following the portion first centrifuged on entrance to the apparatus. Liquid designated as "2nd filtrate" is thrown into chamber 16 and is removed through outlet 22 from which it is pumped to the slurry tank and used as part of the slurrying liquid. This process thus constitutes a novel countercurrent extraction in which an intermediate portion of extracted oil-bearing solvent is used as part of the slurrying liquid for treating the original oil-containing solids. Tube 1 is preferably rotated at such a speed that the liquid is forced through the solid material and the pores of the tube with a force equivalent to that exerted in a vacuum filter operated at a subatmospheric pressure of about 1 inch of mercury.

Vanes 11 are adjusted so that the centrifugal force throws the bulk of the liquid initially in contact with the solid material into compartment 15 before the materials have been forced along tube 1 beyond the inner wall of compartment 15.

Vane support bar 13 is adjusted to leave an appreciable layer of material between the ends of vanes 11 and the surface of tube 1.

By the time the solid particles of the oil bearing material have traversed the tube and entered outlet 10, the particles constitute a substantially oil-free, solvent-damp meal, or "marc," ready for a conventional desolventization treatment.

Conduits 31 to 35 are preferably connected in parallel to a source of a stream, under pressure, of the solvent used, solutions of the oils in the solvents used, or an inert gas such as nitrogen. The rate of flow of the stream is adjusted to prevent the pores of tube 1 and the layer of material on the inner surface of tube 1 from becoming unduly clogged with fine particles.

I claim:

1. An apparatus for the solvent extraction of oil from oil-bearing materials comprising: a porous tube rotatably supported along its periphery and having an inlet and an outlet end; material inlet means adapted to deposit a slurry of liquid and solid materials into the inlet end of said tube, and material outlet means adapted to discharge solid material from the outlet end of said tube; means for rotating the tube at a rate such as to subject material within the tube to a centrifugal force sufficient to press the material against the inner wall of the tube and to cause said material to move in a substantially circular path around the axis of the tube in conjunction with the walls thereof; a plurality of stationary adjustable vanes suspended within the tube along the axis thereof from adjustable suspending means mounted outside said tube, said vanes being adapted to discontinuously contact material pressed against the inner wall of the tube and to impart to said material a movement from the inlet end to the outlet end of said tube.

2. The apparatus of claim 1 in which the inner surface of the porous tube is a filter screen, and a series of compartments surrounding the tube joined together to enclose the whole of the apparatus in a substantially gastight enclosure.

References Cited in the file of this patent

UNITED STATES PATENTS

| | | |
|---|---|---|
| 1,030,973 | Coppage | July 2, 1912 |
| 1,411,154 | Bollmann | Mar. 28, 1922 |
| 1,569,778 | Murphy | Jan. 12, 1926 |
| 1,704,466 | Eddy et al. | Mar. 5, 1929 |
| 2,688,405 | Sharples | Sept. 7, 1954 |

FOREIGN PATENTS

| | | |
|---|---|---|
| 100,787 | Germany | Mar. 28, 1897 |
| 286,855 | Great Britain | Mar. 15, 1928 |